United States Patent [19]

Bowley

[11] 3,848,419

[45] Nov. 19, 1974

[54] FLOATING WAVE BARRIER

[75] Inventor: Wallace William Bowley, Stafford Springs, Conn.

[73] Assignee: William B. Ritchie, Jr., Duxbury, Mass. ; a part interest

[22] Filed: July 27, 1973

[21] Appl. No.: 383,346

Related U.S. Application Data

[63] Continuation-in-part of Ser. No. 357,938, March 7, 1973, which is a continuation-in-part of Ser. No. 267,086, June 28, 1972, abandoned.

[52] U.S. Cl. .................................................. 61/5
[51] Int. Cl. ............................................ E02b 3/04
[58] Field of Search ........................... 61/1 F, 3, 4, 5

[56] References Cited
UNITED STATES PATENTS

| 2,972,233 | 2/1961 | Askevold ................................. 61/5 |
| 3,022,632 | 2/1962 | Parks ........................................ 61/5 |
| 3,534,558 | 10/1970 | Bouteiller ................................. 61/5 |

Primary Examiner—Mervin Stein
Assistant Examiner—David H. Corbin
Attorney, Agent, or Firm—Kenway & Jenney

[57] ABSTRACT

A floating anchored wave barrier is provided comprising a plurality of buoyant members connected by a flexible line. At leat one of the members is an inverted vessel having an annulus attached to the periphery of the vessel. The buoyancy and mass of the members are such that when the barrier is placed in water, the top vessel is positioned at or near the water surface and each vessel is partially filled with air. The remaining members can be a vessel having an annulus attached thereto or a disk having a relatively great horizontal extent compared to its thickness. The remaining members are submerged but near the water surface so that they are located within the top portion of the wave where the major portion of the wave kinetic energy is encountered. The buoyant members move vertically within the water and out of phase with each other so that water between them is placed under a compressive force thereby reducing the vertical wave velocity component and accelerating the horizontal wave velocity component to form a reflected wave and a transmitted wave. The reflected wave reduces the kinetic energy of other incident waves and the transmitted wave fills in the wave trough of water past the barrier thereby reducing the vertical wave velocity component of the water in the trough.

9 Claims, 7 Drawing Figures

FLOATING WAVE BARRIER

REFERENCE TO RELATED APPLICATION

This application is a continuation-in-part of application Ser. No. 357,938, filed May 7, 1973, which in turn is a continuation-in-part of Ser. No. 267,086, filed June 28, 1972, and now abandoned.

BACKGROUND OF THE INVENTION

This invention relates to an apparatus for forming a floating wave barrier for reducing or eliminating the kinetic energy of water waves.

Waves are generated at sea by virtue of the frictional drag exerted on the water surface by the wind whereby the small waves originally generated gradually build up to larger waves to form a pattern which progress towards the shore. It has been determined that the water particles making up the wave travel in a circular or elliptical orbit and that the diameter of the orbits at the water surface equal the height of the wave. Furthermore, it has been determined that the diameter of the orbit at a depth of about half the wave length is only about 4 percent of the orbital diameter at the water surface. Thus, substantially all of the kinetic energy of the wave is concentrated at or near the water surface and the percentage of wave kinetic energy located at a given water depth rapidly decreases with water depth. Thus, a water barrier located at or near the water surface and which extends toward the sea bottom a depth of about one-half the expected wave length can be highly effective in diminishing the wave kinetic energy.

In operation, the incident wave strikes the wave barrier which diminishes the kinetic energy of the wave by forming a reflected wave having a finite kinetic energy and allowing a transmitted wave to pass therethrough which has little kinetic energy. It is desirable that the reflected wave kinetic energy be maximized so that it impinges on other incident waves to decrease their kinetic energy prior to striking the wave barrier. The difference between the kinetic energy of the incident wave and the sum of the transmitted and reflected waves constitutes the kinetic energy absorbed by the wave barrier.

It has been proposed in U.S. Pat. No. 3,353,361 to employ a floating wave barrier comprising a plurality of weighted automobile tires attached with a flexible chain depending from a fixed support so that when placed in water the tires are located at different depths. This wave barrier is undesirable since it functions primarily to reduce the horizontal wave velocity component with little effect on the vertical wave velocity component. Since the net horizontal component is constantly directed landward, there is a constant substantial force on the fixed supports. In contrast, it would be desirable to provide a wave barrier which acts to reduce the vertical wave velocity component since the net vertical component is changing direction constantly and acts over a relatively short distance equal to about one-half the wave length so that the force exerted on the wave barrier anchor is reduced.

The invention disclosed in the above-identified applications comprises a floating wave barrier comprising a plurality of plate members each having a substantial portion of their surfaces relatively flat. They are connected with at least one flexible line and one member is connected to an anchor on the sea bottom so that when the barrier is placed in water, the plate members are positioned at different vertical levels with the top member being at or near the surface of the water. The remaining members are submerged but near the water surface so that they are located within the top portion of the wave where the major portion of the wave kinetic energy is encountered. When placed in water, the plate members are fixed to prevent substantial movement in the horizontal direction but are free to move in a vertical direction within the wave with the vertical movement of each plate member being out of phase with the other plate members.

When the out-of-phase plate movement causes two plates to move toward each other, the water between them is placed under a compressive force in the vertical direction which force is generated from the plates' acceleration and the masses of the plate and the water above the downwardly moving plate and the water below the upwardly moving plate. This causes the water between the plates to be accelerated horizontally to form a reflected wave in the seaward direction and a transmitted wave in the landward direction. The reflected wave contacts other incoming incident waves to reduce their kinetic energy prior to contacting the barrier and the transmitted wave tends to fill up the wave trough directly preceeding it to reduce the vertical force component of the water therein. A plurality of these barriers are arranged substantially parallel to the shore being protected at varying distances from the shore so that a given portion of the wave contacts more than one barrier prior to reaching the shore.

SUMMARY OF THE INVENTION

The present invention provides a floating wave barrier comprising at least one vessel having a top, walls and an open bottom which, when placed in water, has the open bottom submerged. The vessel has at least one plate member attached to the outside surface of the vessel and extending around all or a major portion of the vessel periphery. The vessel or vessels, when placed in water, contain a gas and water. When the plurality of vessels are employed, they are connected with at least one flexible line and one vessel is connected to an anchor on the sea bottom so that when the barrier is placed in water, the vessels are positioned at different vertical levels, with the top member being at or near the surface of the water. The remaining vessels or, if only one vessel is employed, plate members are submerged but near the water surface so that they are located within the top portion of the wave where the major portion of the wave energy is encountered. When placed in water, the vessels and plate members are fixed to prevent substantial movement in the horizontal direction but are free to move in a vertical direction within the wave with the vertical movement of the connected vessels and plate members being out of phase with each other.

The wave barrier of this invention dampens the vertical velocity component of waves by generating reflected waves in a seaward direction to impinge upon incoming waves and by displacing water from a wave at its crest to an adjacent wave trough. A plurality of these barriers are arranged substantially parallel to the shore being protected at varying distances from the shore so that a given portion of the wave contacts more than one barrier prior to reaching the shore.

BRIEF DESCRIPTION OF THE DRAWINGS

The present invention will be described more fully with reference to the accompanying drawings.

DESCRIPTION OF SPECIFIC EMBODIMENTS

Figure 1:
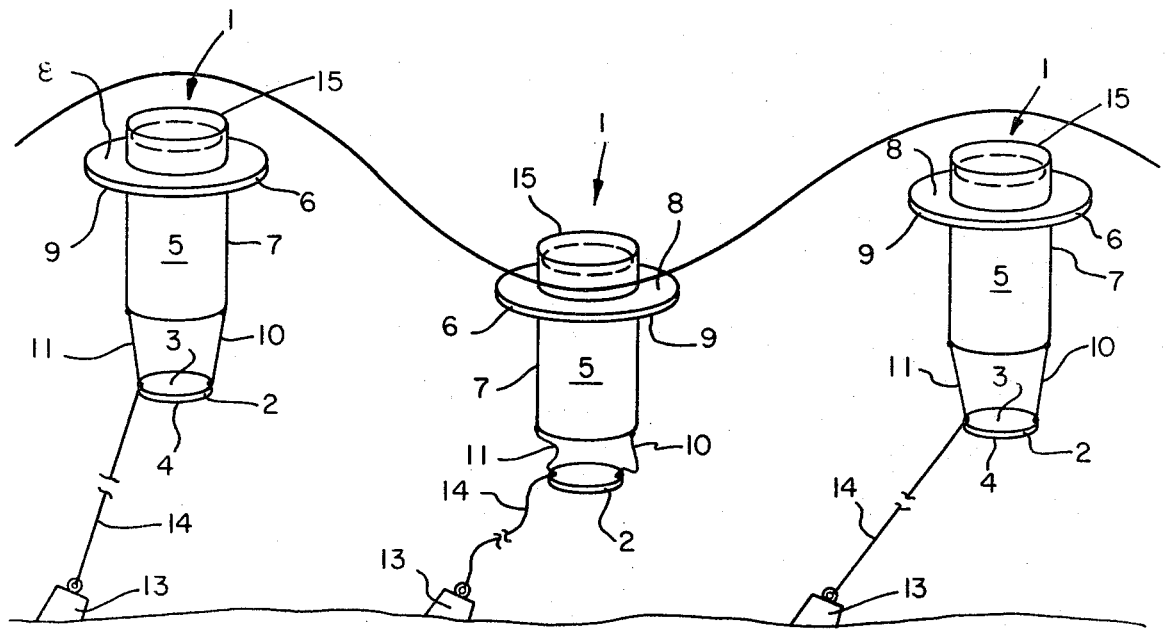
FIG. 1 is a side view of a barrier of this invention in place.

The embodiment shown in FIG. 1 comprises a plurality of wave barriers 1, each comprising a disk 2 having a generally rectangular cross section and two circular horizontal flat surfaces 3 and 4 and a hollow vessel 5. The vessel 5 has an annulus 6 attached thereto and extending around the entire periphery of vessel 5. The annulus 6 has a generally rectangular cross section and two circular horizontal flat surfaces 8 and 9. For each barrier 1, the disk 2 and vessel 5 are joined by flexible lines 10 and 11 for example, a rope or chain. Disk 2 is attached to an anchor 13 by flexible line 14. The average specific gravity of vessel 5, annulus 6 and disk 2 is such as to permit the vessel, annulus and disk to remain at or near the water surface when submerged. Furthermore, the masses and specific gravity of each disk 2, annulus 6 and vessel 5 are controlled so that they are maintained generally along a common vertical axis with respect to each other while submerged. As shown, the distance between the top 15 of vessel 5 and the bottom surface 4 of disk 2 is about one-half the wave length of the expected waves. This distance can be longer or shorter as desired. However, as noted above, approximately 96 percent of the kinetic energy of the wave is located within this distance.

Figure 2A:
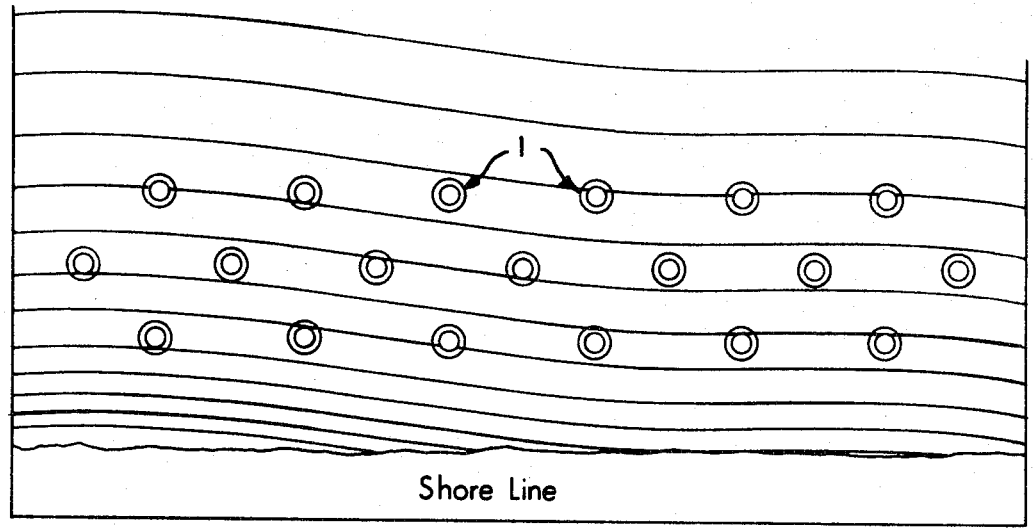
FIGS. 2a, 2b and 2c are top views of alternative configurations for arranging the wave barriers of this invention.
Figure 2B:
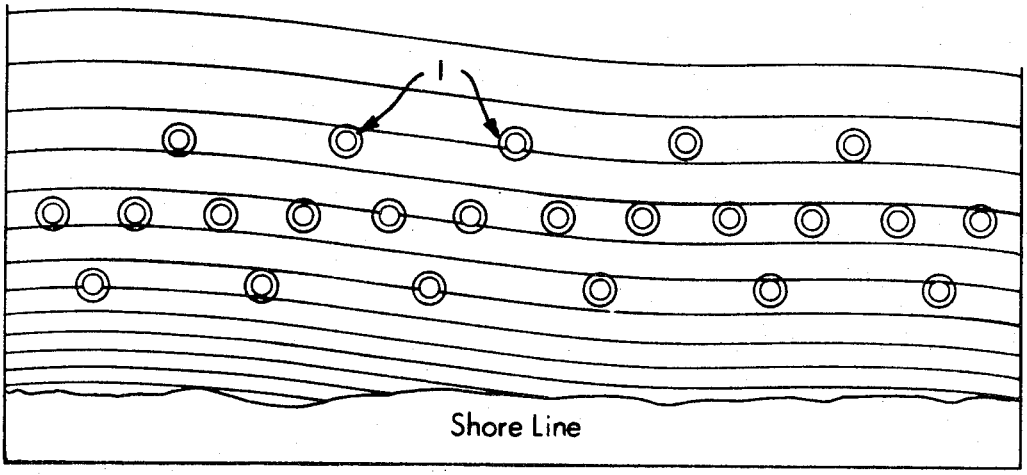
Figure 2C:
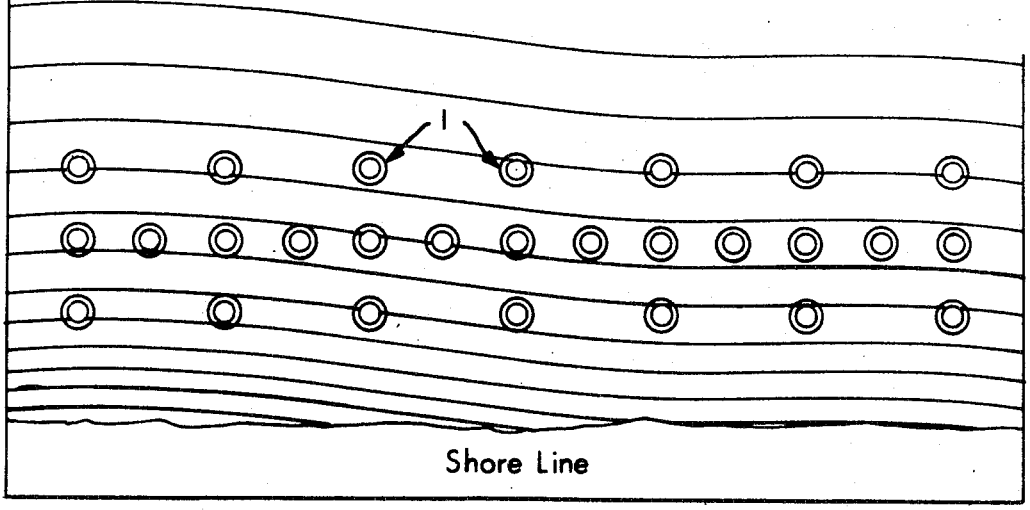

Suitable alternative configurations for placing the barrier in the water are shown in FIGS. 2a, 2b and 2c and have a common object of providing effective wave dampening along a desired length of shoreline so that substantially all of the wave kinetic energy located near or at the water surface is eliminated. The barriers are placed a suitable distance from the shore line so that they contact deep water waves but not so far as to allow the dampened waves to build-up kinetic energy prior to reaching the shore. To attain relatively complete wave dampening, the barriers are placed within about three of the combined diameters of the vessel 5 and annulus 6 from each other. A particularly suitable means for maintaining the desired barrier configuration is to anchor a net to the sea bottom, to which the barriers can be anchored.

Figure 3:
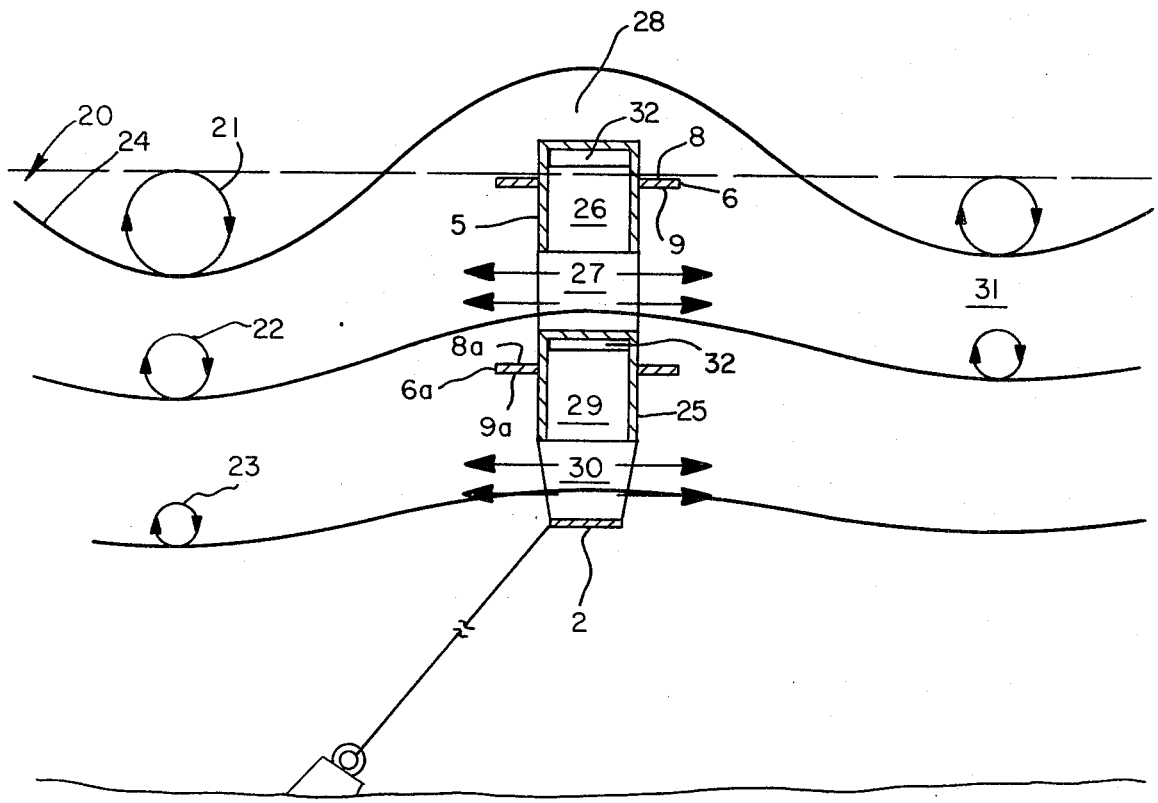
FIG. 3 is a side view of the apparatus of this invention illustrating one form of the mechanics involved in its use.

One aspect of the mechanics of this invention is described with reference to FIG. 3. The kinetic energy and circular orbits of the water particles in the wave 20 are represented by the circles 21 and 22 and 23 with circle 21 having the largest diameter since the particles have a greater kinetic energy nearer the surface 24 of the wave 20. The vessels 5 and 25 and disk 2 move vertically by virtue of their contact with waves prior to wave 20. This motion generally is along a common vertical axis and is such that the motion of the vessels 5 and 25 and disk 2 is out of phase so that at any given time, two adjacent vessels and/or disk are moving either toward each other or away from each other. This motion serves to dampen the vertical velocity component by two mechanisms. One mechanism is described conveniently with reference to vessel 25. During at least a portion of the time that vessel 25 is rising, vessel 5 and the water 26 contained therein are falling. When vessel 25 rises, it causes the water 27 between it and vessel 5 to move upward and contact the downwardly moving water 26 and vessel 5. Since the force of the rising water 27 acts against the force of the downwardly moving water 26 and vessel 5 and the water 28 above vessel 5, the vertical component of the water 27 is reduced. Similarly, disk 2 is rising during at least a portion of the time that vessel 25 and water 29 contained therein is falling and the vertical component of the water 30 between the disk 2 and vessel 25 is dampened in the same manner.

A second mechanism by which the vertical velocity component is dampened results from the compression force exerted by two adjacent vessels or vessel and disk on the water therebetween to accelerate the water in a horizontal direction either landward or seaward. The water directed seaward forms a reflecting wave which impinges upon incoming waves thereby reducing the kinetic energy of the incoming wave. The water accelerated in a horizontal direction toward the shore tends to fill up the trough portion of water already transmitted past the floating barrier thereby to reduce the vertical velocity component of the water 31 past the floating barrier which is about to rise.

A third mechanism by which the vertical velocity component is dampened results from the successive retention of water by the vessel and subsequent distribution of the retained water from the vessel. As the vessel contacts the crest of a wave, the water pressure surrounding the vessel is increased beyond that in the vessel so that water enters the vessel until the pressure in and outside the vessel is equalized. Pressure equalization is achieved by virtue of the gas layer 32 being compressed by the water entering the vessel. As the wave crest passes the vessel, the water pressure surrounding the vessel is reduced down to a minimum outside pressure when the vessel is in the wave trough. During this reduction in pressure, the water added to the vessel is distributed therefrom into the water outside the vessel. This mechanism has the effect of tending to equalize the amount of water throughout the wave at or near its surface thereby reducing the height of the wave crest and increasing the height of the trough. It is not essential that the vessels contain a gas when placed in water.

Figure 4:
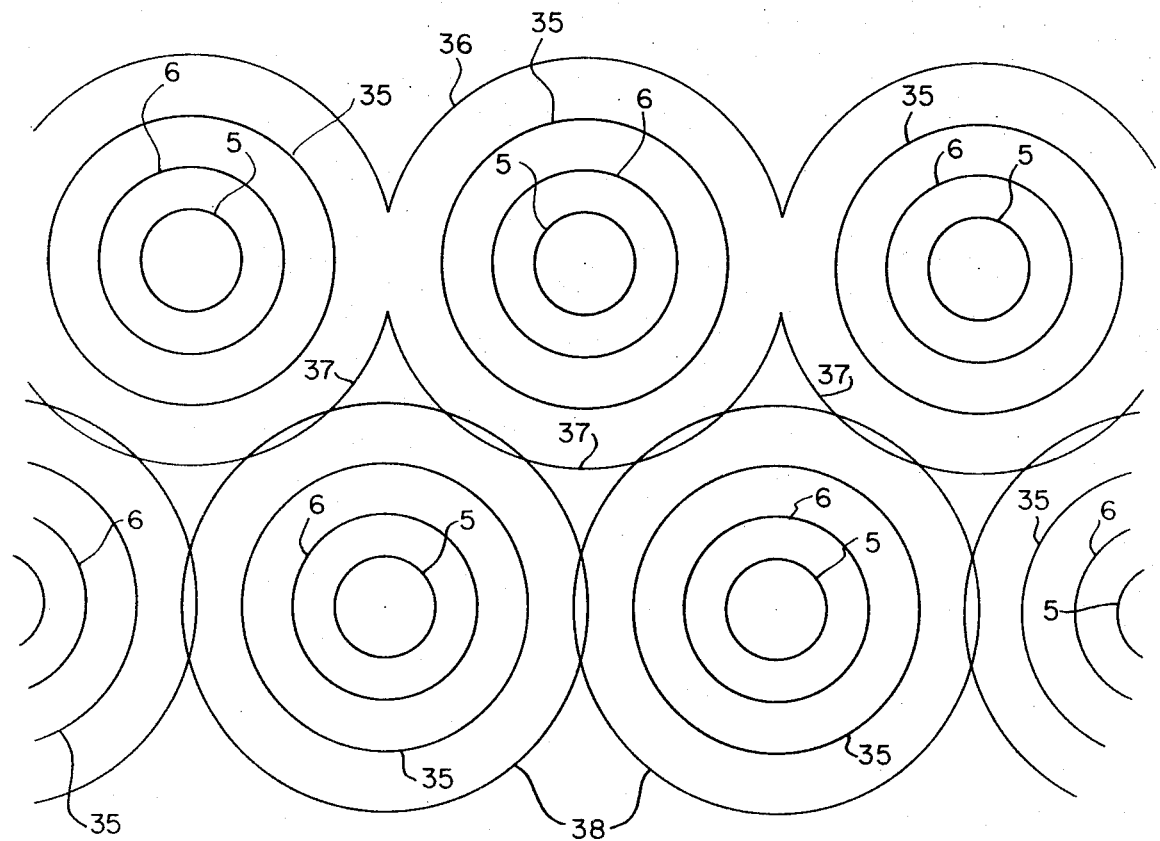
FIG. 4 is a top view of the apparatus of this invention illustrating one form of the mechanics involved in its use.

A fourth mechanism by which the wave barrier of this invention reduces the vertical velocity component is described with reference to FIG. 4. As noted above, it is desirable that the wave barrier form a reflected wave to reduce the kinetic energy of incoming waves and to produce a transmitted wave to fill in a wave trough which is adjacent to and past the wave barrier. Annuli 6 and 6a attached respectively to vessels 5 and 25 act as paddles which generate waves when the vessels 5 and 25 move vertically within the wave. The mass of the water and vessel stabilize the position of the annuli attached to the vessels so that their surfaces 8, 9, 8a and 9a are maintained on a generally horizontal plane while the vessels 5 and 25 move in a generally vertical plane. Each annulus 6 and 6a generates a small, generally circular wave and the generated waves formed from adjacent wave barriers contact and coalesce to form a reflected wave 36 which impinges upon incoming waves to reduce their kinetic energy prior to contacting a wave barrier. In addition, a wave 37 is formed by the coalescence of waves 35 from adjacent wave barriers. The wave 37 tends to fill-in the trough of waves having passed the first set of wave barriers thereby to reduce the vertical velocity component of waves transmitted through the first set of wave barriers. Similarly wave 38 formed by the second set of wave barriers tends to fill-in the troughs of transmitted waves.

The mass and buoyancy of the individual vessels and disks are controlled to maintain the generally vertical spaced-apart relationships and the vertical movement of the vessels and disks in water described above. In addition, the vessels and disks are spaced apart along a flexible line a distance so that they do not contact during use but are sufficiently close to effect dampening of the vertical wave component by the mechanisms described above. For example, in areas where 4 to 5 foot water waves are expected, the vessels and disks are spaced apart a distance of about 12 to 15 feet. In smaller waves, the distance between plates is less than 3 to 4 feet and in larger waves the distance is greater than 40 to 50 feet. The distance between vessels and disks for a given set of expected wave conditions and vessel or disk buoyancy and mass can be determined easily by calculating the forces on the vessels and disks and the forces exerted by the moving vessels and disks.

It is to be understood that the vessels can be of the same size or different sizes. It is preferred that the vessels nearest the surface have the largest volume and the bottom vessel have the smallest volume with the intervening vessels gradually being smaller as a function of water depth because the vessels at the lower depths encounter a reduced portion of the wave kinetic energy as compared to the vessels at or near the surface and the cost of increasing their size generally is not justified. In addition, it is preferred that the anchor be attached to the bottom vessel or disk since it encounters a smaller portion of the wave kinetic energy and the adverse effect on wave dampening caused by the attendent restriction on its vertical movement thereby is minimized.

The size 1. the vessels and disks employed can be varied widely. Exemplary suitably sized vessels in areas where 4 to 5 foot water waves are expected have a volume of about 340 to 450 cubic feet, a height of about 12 to 16 feet and a diameter of about 5 to 7 feet. The annulus attached to a vessel has a ratio of major effective diameter (including the diameter of the vessel) to its vertical dimension of at least about 20 to 1. In smaller waves, the volume, height and diameter of the vessel could be less while in larger waves, the volume, height and diameter of the vessel could be larger.

As noted above, the vessel can be employed in conjunction with one or more additional vessels to form a wave barrier or can be employed with one or more disks. When employed with one or more disks, the vessel comprises the top member of the wave barrier. In any case, a disk should be positioned adjacent the bottom of the lowermost vessel to coact therewith in the manner described above unless the bottom of the lowermost vessel extends below the water level wherein the significant portion of the wave kinetic energy is encountered, i.e., one-half the wavelength. When the bottom of the lowermost vessel extends to a water level greater than one-half the wavelength disks can be interposed between vessels at a vertically intermediate water depth.

When individual disks are employed, the ratio of disk major effective diameter to its vertical dimension should be at least about 10 to 1 to attain effective wave dampening. Each disk or vessel can be modified to position the center of gravity thereof as desired. Thus, the periphery on either surface of a disk either alone or attached to a vessel can be formed of a material having a different density than the average density of the disk. It has been found desirable to form the periphery of the disk from a material having a higher density than the average disk density thereby to increase the mass at the periphery, increase the moment of inertia of the disk and increase its vertical movement in a wave.

Figure 5:
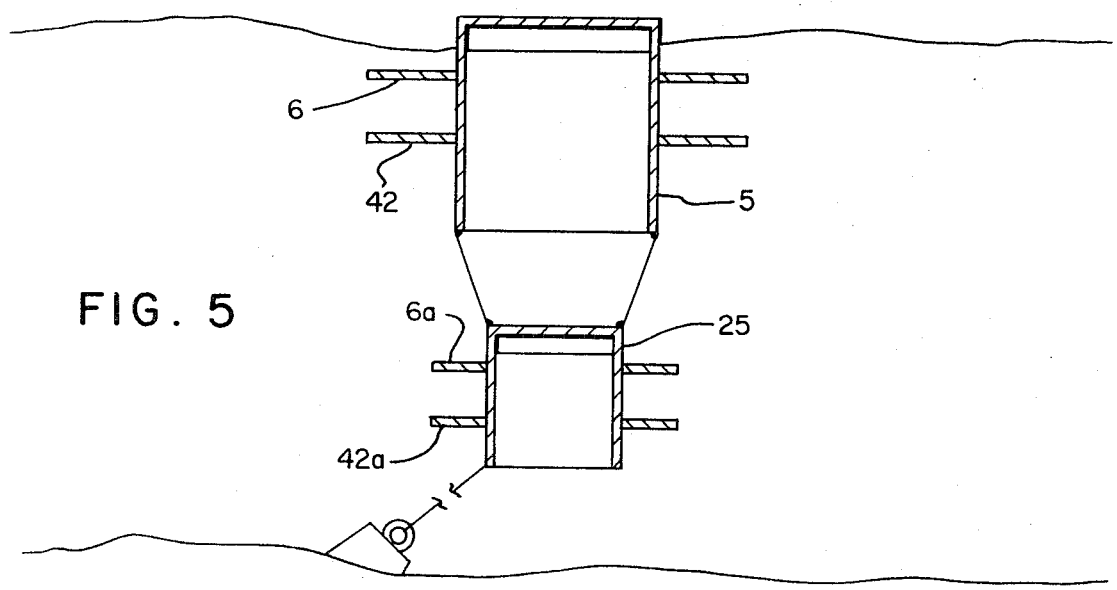
FIG. 5 is a side cross-sectional view showing two alternative embodiments of this invention.

An alternative embodiment is shown in FIG. 5 wherein each vessel 5 and 25 has a plurality of annuli 6 and 42 and 6a and 42a. When a plurality of annuli are attached to a vessel, they function to trap water therebetween and increase the inertia of the system. Generally the annuli on the vessel are spaced apart a distance of about one half the diameter of the vessel.

It is to be understood that the disk and annulus configurations shown in the drawings are only representative of a large number of configurations that can be employed. All that is needed is that the disk or annulus has two surfaces which have a relatively great horizontal extent compared to its thickness to obtain the desired effect; namely, the "squeezing" effect noted above on the water and to prevent substantial bypass of water around the disk or annulus in a vertical direction during vertical movement. Thus the disk or annulus surfaces can be flat, slightly concave, slightly convex, corrugated, etc., and still prevent substantial undesirable water by-pass. In addition, these surfaces need not be circular but can be elliptical, polygonal etc.

I claim:

1. A wave barrier comprising a plurality of buoyant members, at least one of said members comprising a vessel having a closed top, an open bottom and at least one annulus secured to the exterior of the vessel, the remainder of said members being a disk or one of said vessels having at least one annulus attached to the exterior of the vessel, said members being flexibly suspended to each other and, when anchored in water having a configuration such that the members are located at different vertical levels along a common vertical axis and each vessel has its bottom at a lower water level than its top, each of said disks being of relatively great horizontal extent compared to its vertical dimention, the mass and buoyancy of said members and the distance between said members being such as to provide vertical, out of phase motion of said members to exert a compression force on water between said members to reduce a vertical wave velocity component and increase a horizontal wave velocity component in both a landward and seaward direction without substantial contact of said members.

2. The wave barrier of claim 1 wherein the distance between the top of the top buoyant member and the bottom of the lowermost buoyant member is about one-half the wave length of normal waves in which the barrier is positioned.

3. The wave barrier of claim 1 having two vessels each having at least one annulus attached to the exterior of the vessels and a disk flexibly suspended from a vessel, said disk comprising the vertically lowermost member when the barrier is placed in water.

4. The wave barrier of claim 2 having two vessels each having at least one annulus attached to the exterior of each vessel and a disk flexibly suspended from a vessel, said disk comprising the vertically lowermost member when the barrier is placed in water.

5. The wave barrier of claim 1 wherein the lowermost buoyant member is attached to an anchor with a flexible line.

6. Apparatus for reducing or eliminating the vertical kinetic energy component of water waves on a shore line comprising a plurality of the wave barriers of claim 1 positioned generally parallel to the shore line at different distances from the shore line so that a given portion of an incident water wave contacts at least two of said barriers.

7. Apparatus for reducing or eliminating the vertical kinetic energy component of water waves on a shore line comprising a plurality of the wave barriers of claim 2 positioned generally parallel to the shore line at different distances from the shore line so that a given portion of an incident water wave contacts at least two of said barriers.

8. The apparatus of claim 6 wherein said barriers are anchored to a net located on and secured to the sea bottom.

9. The apparatus of claim 7 wherein said barriers are anchored to a net located on and secured to the sea bottom.

* * * * *

UNITED STATES PATENT OFFICE
CERTIFICATE OF CORRECTION

Patent No. 3,848,419　　　　　　　　Dated November 19, 1974

Inventor(s) Wallace W. Bowley

It is certified that error appears in the above-identified patent and that said Letters Patent are hereby corrected as shown below:

In the specification, column 5, line 51 change "1."
to --of--

In the specification, column 5, line 60 change "smaller"
to --small--

Signed and sealed this 21st day of January 1975.

(SEAL)
Attest:

McCOY M. GIBSON JR.　　　　　　　　C. MARSHALL DANN
Attesting Officer　　　　　　　　　Commissioner of Patents